April 20, 1954 L. G. KOPP 2,675,659
RESILIENT BIASING MEANS FOR HARROW GANGS
Filed April 26, 1949 3 Sheets-Sheet 1

INVENTOR.
LESTER G. KOPP
BY H. M. Alexander
& E. J. Werlich
ATTORNEYS

April 20, 1954  L. G. KOPP  2,675,659
RESILIENT BIASING MEANS FOR HARROW GANGS
Filed April 26, 1949  3 Sheets-Sheet 3

INVENTOR.
LESTER G. KOPP

Patented Apr. 20, 1954

2,675,659

UNITED STATES PATENT OFFICE 2,675,659

RESILIENT BIASING MEANS FOR HARROW GANGS

Lester G. Kopp, Leavenworth, Kans., assignor to Harry Ferguson, Inc., Detroit, Mich., a corporation of Delaware Application April 26, 1949, Serial No. 89,582

8 Claims. (Cl. 55—81)

This invention relates to a construction for earth-working tools by which the tools are allowed a relatively free movement required for irregularities in ground contour and yet are urged so as to be maintained against the ground with appropriate force. More specifically, the invention relates to the connection of resilient or spring means to earth-working elements such as disk harrows in such a manner as to maintain appropriate resilient pressure against the elements in various positions of adjustment.

An object of the present invention is to provide an arrangement of adjustable earth-working tools, a carrying structure therefor, and resilient means maintaining engagement of the tools with the ground while permitting yielding of the tools with varying ground contour, whereby requisite pressure of the resilient means on the tools is obtained in various positions of adjustment of the tools.

A further object is to provide an arrangement in which the pressure exerted on the adjustable tools to maintain them in contact with the ground is varied somewhat in accordance with the position of adjustment of the tools. In ground-working implements such as disk harrows for which the axes of rotation of the mounting shafts may have a transport position transverse to the line of movement of the harrows over the ground and various working positions other than transverse to the line of movement, the greater the displacement of the harrow axis from transverse to the line of movement, the greater the effort required to maintain the harrow gangs in proper engagement with the ground. Accordingly, I have invented an arrangement of resilient or spring means for adjustable tools or harrow gangs and carrying structure, by which the yielding pressure applied by such spring means is increased to match the increased effort required for proper ground working arising with increased adjustment of the tools away from transport position.

Another object is to apply to earth-working tools generally universally connected to a carrying structure so as to be adjustable with respect thereto between various working positions, a resilient or spring means urging movement transverse to the general plane of adjustment of the tools between various working positions, and to dispose the resilient means to the universal connection between the tools and the carrying structure in such a way as to maintain proper yielding pressure against the tools throughout the various positions of adjustment of the tools while providing for some variation of such pressure in accordance with variation in the working position of the tools.

Still another object is to devise a construction providing a pivotal mounting for adjustable earth-working tools on a carrying structure and a connection for one end of resilient means applying pressure against the tools to maintain their engagement with the ground.

A still further object relates to the provision of an improved control apparatus by which the working position of earth working tools such as harrow gangs is adjusted.

Other objects will appear from the disclosure.

The improved ground-working device of the present invention may be advantageously mounted upon a tractor in the manner disclosed in Ferguson Patent 2,118,180, dated May 24, 1938, according to which lower draft links are actuated by means of an hydraulic power unit on the tractor to position the device for transport, and an upper draft link is responsive to ground pull upon the device and acts upon a control for the hydraulic power unit so as to cause the lower links to adjust the height of the implement to maintain a predetermined ground pull on the device. However, the device of the present invention may also be mounted upon a tractor in other ways so as to be lifted by other tractor power mechanisms or by hand-operated mechanisms. The ground-working device of the present invention may also simply trail behind the tractor, and in this case the device will not be lifted at all and for transport will be adjusted angularly to minimize the forces exerted between the ground and the ground-engaging elements.

Figure 1:
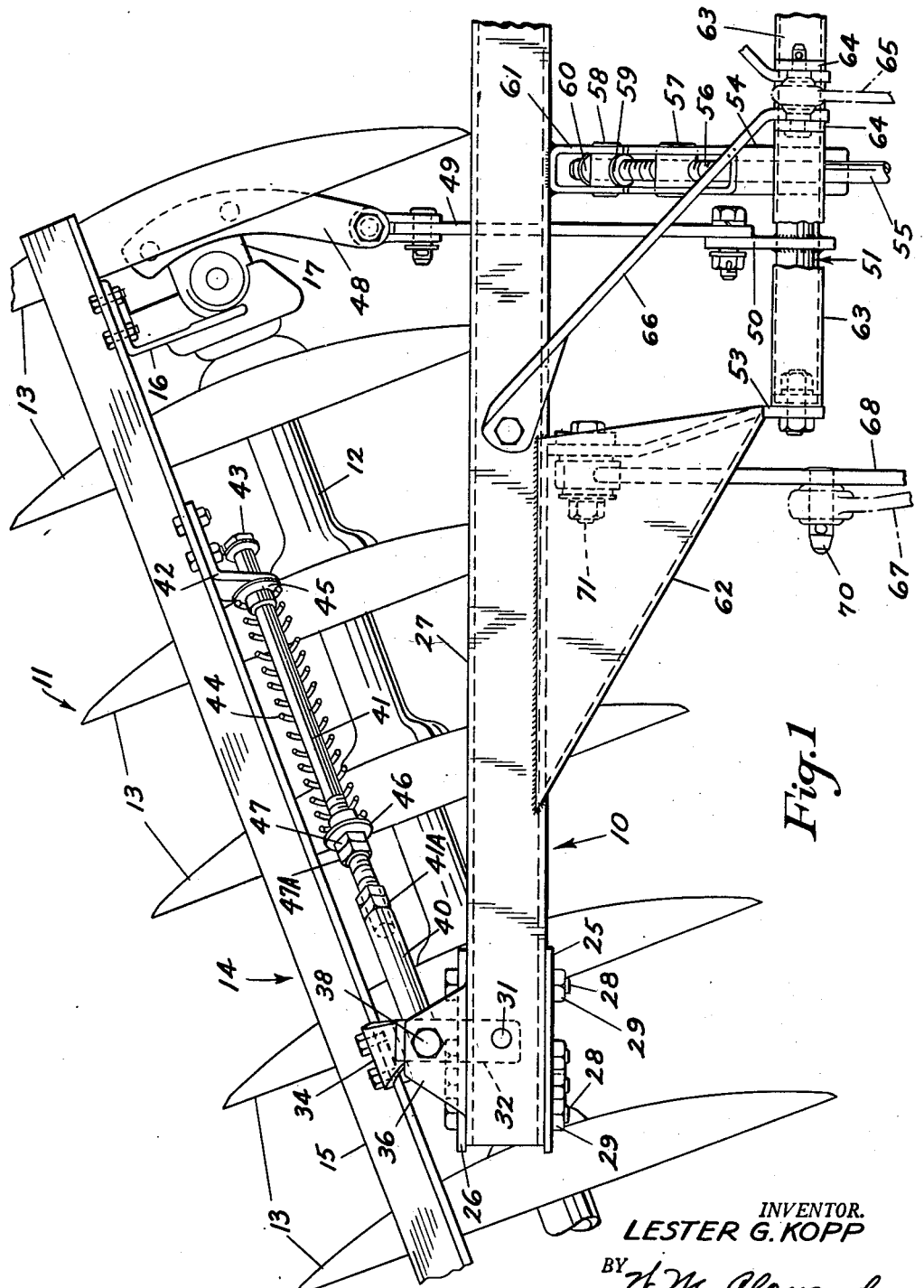
Figure 1 is a plan view of a part of a harrow of the present invention.
Figure 2:
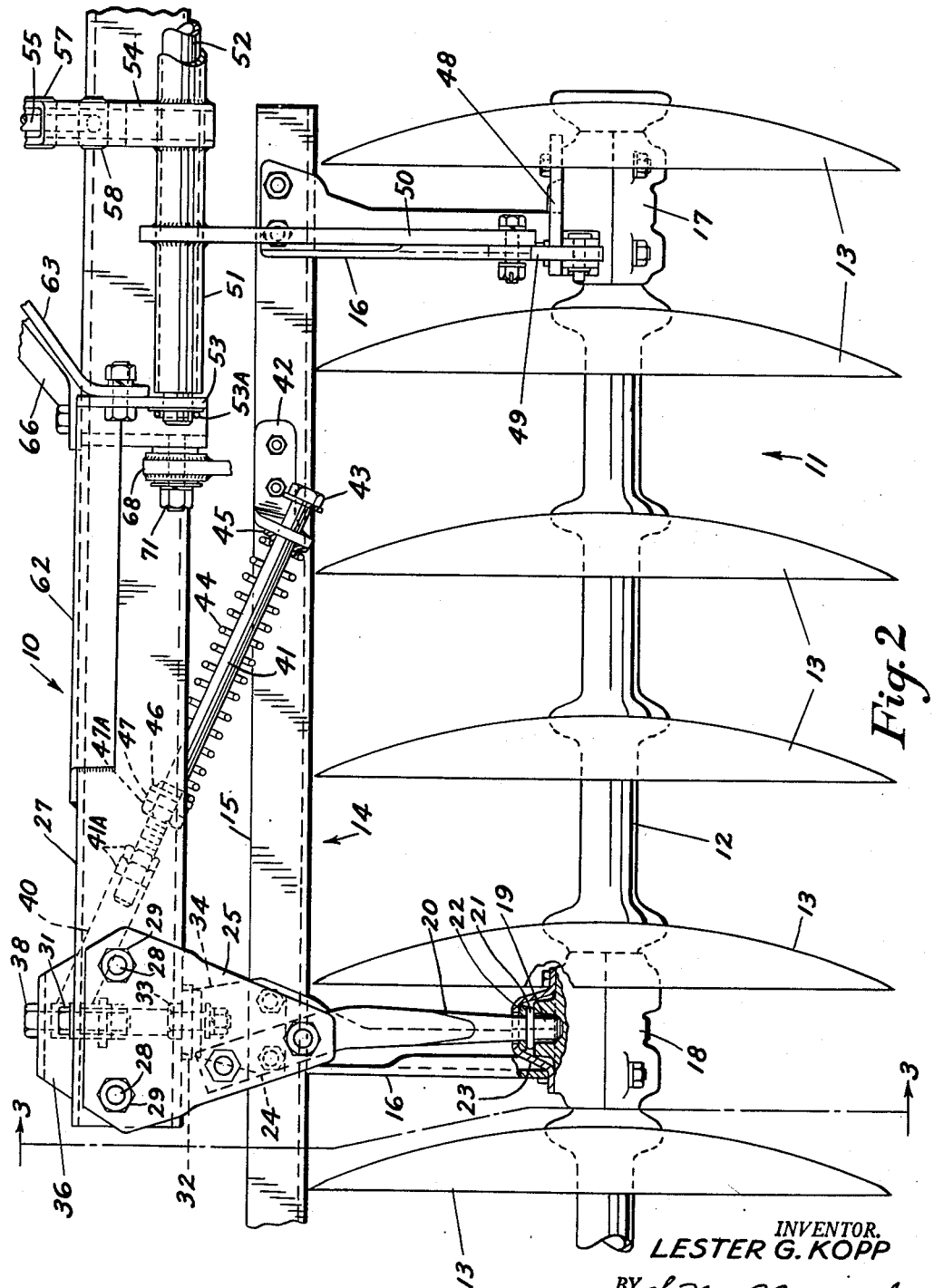
Fig. 2 is the front elevation of the part of the harrow shown in Fig. 1, with portions in sections.
Figures 3, 4:
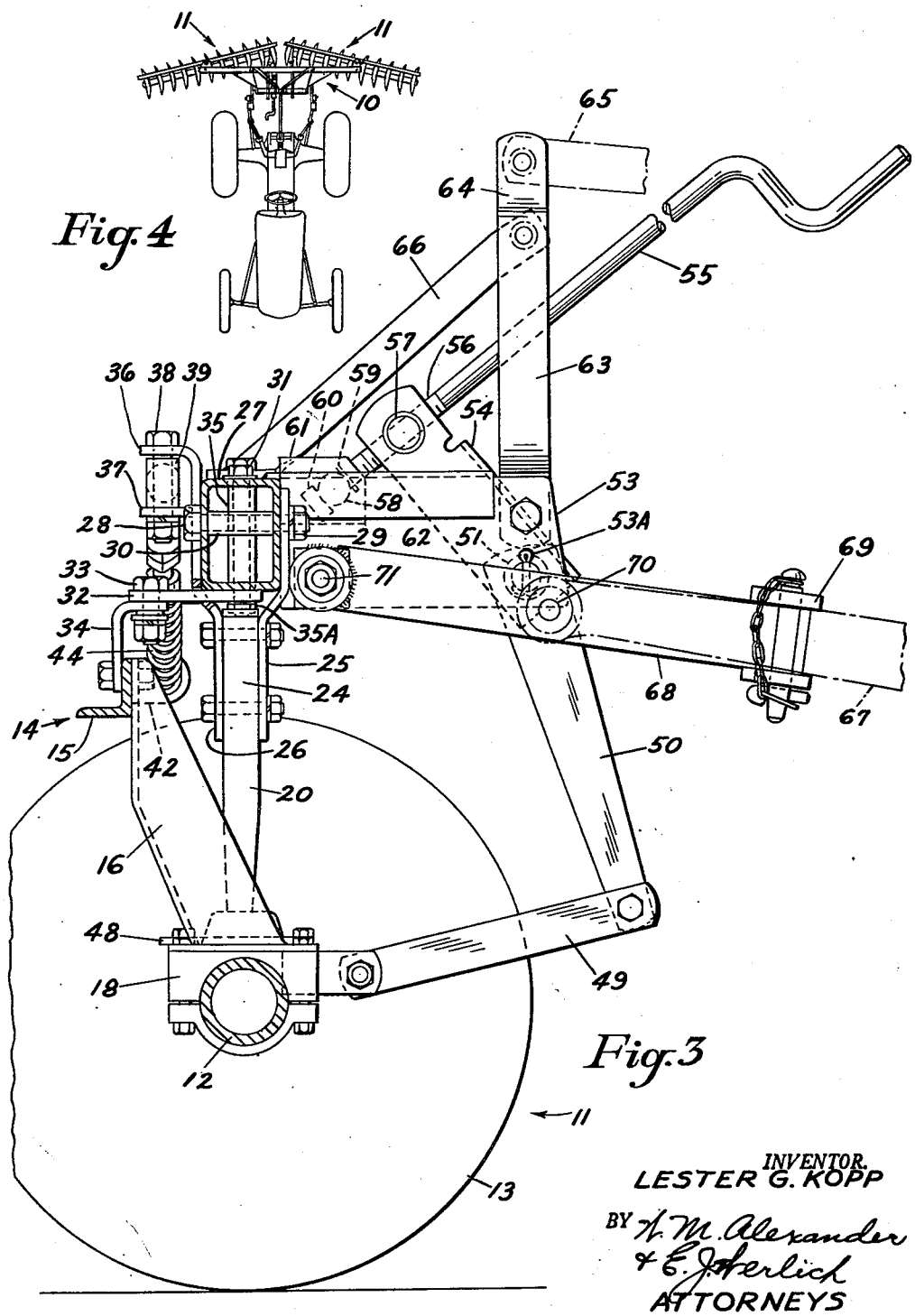
Fig. 3 is a sectional view taken along line 3—3 of Fig. 2.
Fig. 4 is a diagrammatic plan view of the harrow.

The implement of the present invention is shown by way of example as a disk harrow. This harrow comprises a frame 10 and a pair of disk gangs 11, as shown in Fig. 4. As shown in Figs. 1, 2 and 3, each disk gang comprises a shaft 12, a plurality of discs 13 mounted on the shaft and a brace 14. The brace comprises an angle member 15, which parallels the shaft 12 and three connecting angle pieces 16, two of which are shown in Fig. 2 to connect the right end and mid region of the angle member 14 and bearings 17 and 18, mounting the right or inner end and the mid region of the harrow shaft 12. The third angle piece 16 is not shown but will be understood as connecting the left end of angle member 14 and a bearing, not shown, mounting the left or outer end of harrow shaft 12. Each of the bearings 17 and 18 is formed of complemental sections bolted together about the harrow shaft.

The upper section of the bearing 18 is recessed as indicated in Fig. 2, and loosely receives in the recess a lower end 19 of a spindle 20. Adjacent the end 19 on the spindle is a shoulder 21 engaging the top section of the bearing 18 around the recess. Beyond the shoulder is a ring 22. A cap 23 is secured to the upper section of the bearing 18 and acts through the ring 22 and the shoulder 21 to retain the end 19 of the spindle 20 in the recess in the bearing 18. The loose fit of the spindle end 19 in the bearing 18 permits the harrow gang to be pivoted about the spindle end. The spindle 20 has an inclined upper end 24, as indicated in Fig. 2, bolted between plates 25 and 26. These plates embrace a beam 27 of hollow rectangular section, forming part of the frame 10, the plates being secured to the beam 27 by bolts 28 and nuts 29. Each bolt 28 is surrounded by a sleeve 30 which extends through the beam 27 and the plates 25 and 26 and serves as a stop limiting tightening of the nut 29 so as to prevent collapse of the beam 27.

As shown in Fig. 3, a bolt 31 extends vertically through the beam 27 in alignment with the spindle 20, and carries at its lower end at the under side of beam 15, a short link 32, which extends through an opening in the plate 26 and is connected by a bolt 33 to a piece 34 secured to the angle member 15 of the harrow brace. A sleeve 35 surrounds the bolt 31 and extends through the beam and through the link 32 to limit tightening of a nut 35A on the bolt 31, thereby preventing collapse of the beam 27. Since the upper end 24 of the spindle 20 is inclined, there is room beneath the beam 27 for the lower end of the bolt 31 and a retaining nut 35A. The link 32 is loosely connected with the bolts 31 and 33 so that limited freedom of movement is obtained between the harrow brace member 15 and the beam 27, whereby the harrow gang 11 has a limited universal movement with respect to the beam 27 about the lower end 19 of the spindle 18.

The upper end of the strap 26 is bent laterally as indicated at 36, and a piece 37, welded to the strap 26, extends laterally therefrom in generally parallel spaced relation to the bent end 36. The bent end and the piece support a bolt 38 retained by a nut. The bolt loosely receives a short tubular section 39 secured to the end of a member 40. The member 40 has a threaded bore at its opposite end adjustably receiving the threaded end of a long bolt 41. Jam nuts 41A hold the bolt 41 and member 40 against adjustment. The bolt 41 extends loosely through an opening in a bracket 42 secured to the harrow brace angle 15. A bolt head 43 is adjacent bracket 42. A coil spring 44 is positioned on the bolt and engages a collar 45 at one end pressed against the bracket 42 and at the other end a collar 46, which engages a nut 47 adjustably positioned on the bolt 41. The nut 47 is held against movement by a jam nut 47A. The member 40 and the bolt 41 may be considered to constitute an adjustable rod connected at one end through the tubular section 39 and the bolt 38 with the frame 10 and at the other end with the harrow gang through the bracket 42 on the brace angle 15. The aforementioned rod is adjustable in length by the connection between the bolt 41 and the member 40, and the pressure of the spring 44 exerted between the bracket 42 and the nut 47 may be adjusted by adjustment of the nut 47 along the bolt 41. The rod and the spring 44 resiliently urge the inner end of the harrow gang 11, or the right end as viewed in Fig. 2, downwardly about the spindle end 19 as a pivot. Downward movement of the inner end of the gang is limited by engagement of the bolt head 43 with the bracket 42.

A part 48 secured to the bearing 17 on the inner end of the gang is connected at one end to a link 49, the other end of which is connected to an arm 50. This arm is secured by welding to a sleeve 51 and depends therefrom. The sleeve 51 is mounted upon a supporting tube 52 projecting at each end through member 53 extending from and secured to the beam 27. Figs. 1 and 2 show only a single member 53, since only a half of the harrow is shown in this view, but it will be understood that there is a similar member 53 at the other end of the supporting tube 52. The tube 52 is held against endwise displacement with respect to the members 53 by cotter pins 53A. Reference has been made to one depending arm 50 secured to the sleeve 51, and it will be understood that there is another similar arm secured to the sleeve 51 in depending relation and connected by a link similar to the link 49 to the inner end of the other harrow gang, not shown in Figs. 1 and 2. An upwardly extending arm 54 is secured as by welding to the sleeve 51. This arm is U-shaped in transverse section except at its upper end where only the legs of the U are present. An adjusting crank 55 extends between these legs. The crank has a threaded portion 56 having engagement with a pivot member 57 mounted in the legs at the upper end of the lever 54. The lower end of the crank 55 extends through a member 58 and carries on each side of the member collars 59 and 60 which prevent axial movement of the crank 55 with resepct to the member 58. However, the rod 55 may have rotational movement with respect to the member 58. The member 58 is pivotally mounted in a U-shaped bracket 61 secured as by welding to the beam 27. Thus, since, as previously described, the lower end of the rod 55 has rotational movement but no axial movement with respect to the member 58, the lower end of the rod 55 also has rotational movement but no axial movement with respect to the bracket 61 and the beam 27. Rotation of the rod 55 causes the member 57 to be shifted along the rod, and this results in angular or rotational movement of the U-shaped arm 54, the sleeve 51, and the depending arms 50. The resultant movement of the lower ends of the arms 50 is transmitted through the links 49 and the members 48 to the inner ends of the gangs 11, causing them to be shifted in a generally horizontal plane about the lower ends of the spindles 20 as pivots. Fig. 1 shows one harrow gang 11 in an angled or working position, in which it has an angle with respect to the beam 27 of the frame 10 and is angled and misaligned with respect to the other harrow gang as shown in Fig. 4. If the gangs are to work the soil less, the crank rod 55 is rotated so as to move the lower ends of the depending arms 50 to the right in Fig. 3 in order to decrease the angle of the gangs with respect to the beam 27 and to bring them more nearly into alignment with one another.

Each gang 11 may pivot about the lower end of the spindle 20 in a vertical plane or, in other words, transversely to the general horizontal plane of adjustment of the gangs between working positions or between working positions and a transport position in which the gangs are generally aligned with one another and parallel to the beam 27. The pivotal movement of the gangs in a vertical plane permits them to follow irregularities in ground contour. Upward movement of the inner end of each gang is resiliently resisted by the coil spring 44, for during such movement the bracket 42 and collar 45 will move upwardly along the bolt 41 compressing the spring 44. Because of the loose fit of bolt 41 in the opening in bracket 42 and of tubular section 39 on bolt 38, and because of the previously mentioned loose connections of the short link 32 with the bolts 33 and 35, the aforementioned pivotal movement in a vertical plane of the harrow gang about the lower end of the spindle 20 may take place.

It will be observed that regardless of the angle of the harrow gang, the spring 44 is effective to resist upward movement of the inner end of the gang, for the bolt 41 upon which the spring is mounted is connected through the member 44 and the tubular section 39 with a pivot on the bolt 38, which is generally adjacent a perpendicular through the pivot for the horizontal movement of the gang upon the lower end of the spindle 20. This is apparent from Figs. 2 and 3. Yet, it should be noted that the pivot formed by the bolt 38 is somewhat displaced from the aforementioned perpendicular through the pivot for horizontal movement of the gang, and more specifically it is somewhat displaced in such a direction that the distance between the bracket 42 and the harrow gang 11 and the pivot bolt 38 is decreased as the working angle of the gang is increased. This will be apparent from Fig. 1 in which the head of the bolt may be considered as the projection to the top of the harrow of the gang pivot at the lower end of the spindle 20. Thus, as the gang pivots about the bolt 31, the distance between the bolt 35 and the bracket 42 remains constant, the spacing between the bolts 35 and 38 remains constant, and the angle between the rod 40—41 and the line between the bolts 35 and 38 increases, requiring a shortening of the distance between the bolt 38 and the bracket 42. This action necessarily increases the compression of the spring 44 and the downward force exerted thereby on the inner end of the gang 11. Considerable advantage is obtained thereby, for the increased effort upon the gangs by the ground by increase of working angle of the gangs is balanced by an increased force applied to the inner ends of the gangs to keep them down.

The harrow frame 10 comprises, in addition to the beam 27 and the member 53 triangular pieces 62 which brace the members 53, and upwardly converging members 63 having vertical lower ends bolted to the ends of the members 53. Upper vertical portions 64 of the members 53' are closely spaced. To these vertical portions are connected a top link 65, indicated in dot-dash lines, forming part of a draft connection to a tractor in the manner disclosed in Ferguson Patent No. 2,118,180, dated May 24, 1938. The members 63 are held in upright position by means of struts 66 connecting vertical portions 64 and the beam 27. Lower links 67 indicated in dash-dot lines extend from the tractor in the manner shown in the aforesaid Ferguson patent. Each lower link carries an extension member 68 which has at a forward end a U-shaped retainer 69 for an intermediate portion of the link 67. A pin 70 extends through an opening in the very end of the link 67 and a central region of the extension 68. A bolt 71 connects the rear end of the extension 68 to the member 53 of the harrow frame 10. The top links 65 and the lower links 67 and their extensions 68 connect the harrow frame 10 to the rear of the tractor so that the tractor may pull the harrow along behind it. The links and their extensions permit the harrow to have vertical movement with respect to the tractor as the tractor and harrow move over uneven ground. When the harrow is to be transported, it may be raised by means of the tractor-connected links so that the disks no longer touch the ground, or the gangs 11 may be adjusted until they are aligned with one another and parallel with the beam 27. It is to be understood that the harrow of the present invention may also be connected to a tractor by other means than that disclosed in the aforementioned Ferguson patent. If desired, no provision need be made for lifting the harrow when it is to be transported, for the harrow may also have a simple trail-behind connection with the tractor.

I claim as my invention:

1. Mechanism for yieldingly urging a harrow gang about a pivot on a frame transversely of a general plane in which the harrow gang is adjustable with respect to the gang between various working positions, said mechanism comprising a rod having a generally transverse tubular section at one end, an enlarged head at the other end, means for adjusting the effective length of the rod between the enlarged head and the tubular section, and a shoulder intermediate of the ends and adjustable lengthwise of the rod, a pivot member on the frame receiving the tubular section of the rod displaced from the gang pivot generally adjacent a perpendicular to said plane of adjustment containing the gang pivot, a bracket on the gang displaced from the aforesaid perpendicular through the gang pivot and having an opening slidably receiving the said other end of the rod with the enlarged head engageable with the bracket to limit movement of the gang with respect to the frame in one direction transverse to the plane of adjustment, and a coil spring mounted on the rod and acting between the shoulder on the rod and the bracket for yieldingly opposing movement of the gang in the opposite direction transverse to the plane of adjustment.

2. Mechanism as specified in claim 1, the pivot member for the tubular section on the rod being somewhat displaced from the perpendicular to the plane of adjustment containing the gang pivot, whereby the spacing between the tubular section on the rod and the rod-receiving bracket on the gang is less in one working position of the gang than in another working position, the spacing between the rod shoulder and the bracket is likewise less, and the coil spring by being more compressed exerts a greater force on the harrow gang in the said one working position than in the said other working position.

3. Apparatus for pivotally connecting a frame and a ground-working gang to adapt them for relative adjustment in a general plane between various working positions and to connect to the frame one end of resilient mechanism acting between the frame and the gang to urge the gang transverse to the aforesaid plane of adjustment, said apparatus comprising a spindle pivoted at one end to the ground-working gang, parts embracing the frame and the spindle to fix them to one another, one of the parts having spaced lateral projections, a pin supported on the projections displaced somewhat from the perpendicular to the plane of adjustment containing the pivot of the gang on the spindle, and a tubular section forming one end of the aforesaid resilient mechanism and receiving the pin on the lateral projections.

4. Apparatus for pivotally connecting a frame and a harrow gang having a shaft, discs on the shaft, and a brace spaced from and parallel to the shaft with connections therewith for relative adjustment of frame and gang in a general plane between transport and working positions and to connect to the frame one end of resilient mechanism acting between the frame and the gang brace to urge the gang transverse of the aforesaid plane of adjustment, said apparatus comprising a spindle pivoted at one end to the harrow gang adjacent the shaft, parts embracing the frame and the spindle to fix them to one another, one of the parts having spaced lateral projections, a first pin supported on the projections displaced somewhat from the perpendicular to the plane of adjustment containing the pivot of the harrow gang on the spindle, a tubular section forming one end of the aforesaid resilient mechanism and receiving the first pin, a second pin extending through the frame in general alignment with the spindle, and means including a link connecting the second pin and the gang brace, the link extending through the part having the lateral projections.

5. Mechanism as specified in claim 4, the region on the frame against which each resilient means acts being somewhat displaced from the perpendicular to the plane of adjustment containing the gang pivot, whereby the spacing between the regions on the gang and frame against which the resilient means acts decreases upon adjustment of the gangs to a working position of greater misalignment, and accordingly the forces exerted by the resilient means on the gangs increase.

6. In a disk harrow, in combination, a frame, a pair of disk gangs, means supporting said gangs intermediate their ends on said frame for pivotal movement in a substantially horizontal plane, said gangs being disposed in end-to-end relation transversely of said frame, means for adjusting the inner ends of said gangs with respect to each other in said plane between transport and working positions, and means acting between the frame and the gangs urging their inner ends downwardly with progressively increasing pressure as the gangs approach working position, said means including for each gang a rod pivotally connected at one end to said frame directly to the rear of the pivotal connection of that gang, said rod being inclined downwardly and laterally at an angle to the pivotal axis of the associated gang, abutment means on the associated gang spaced inwardly a substantial distance from its pivotal connection with the frame and apertured to slidably receive the other end of said rod, a shoulder intermediate the ends of said rod, and a compression spring interposed between said shoulder and said abutment means.

7. In a disk harrow, in combination, an elongated frame, a pair of disk gangs pivotally supported on said frame intermediate their ends to swing in a substantially horizontal plane, means connected with the inner ends of said gangs for swinging them simultaneously from an alined position transversely of the frame to an angled position, a rod for each gang pivotally connected at one end to said frame and having a sliding connection adjacent its other end with one of said gangs adjacent the inner end thereof, a compression spring acting between each rod and the associated gang, the pivotal connections of said rods with the frame being located closely adjacent and directly to the rear of the gang pivots and in vertical spaced relation to the gangs to enable said springs to urge the inner ends of said gangs downwardly with substantial force in all positions of the gangs.

8. In a disk harrow, in combination, an elongated frame, a pair of disk gangs pivotally supported on said frame intermediate their ends to swing in a substantially horizontal plane, means connected with the inner ends of said gangs for swinging them simultaneously from an alined position transversely of the frame to an angled position, rods extending from said frame to each of said gangs, each of said rods being pivoted at one end on the frame substantially above the gang and extending downwardly therefrom and having at its other end a sliding connection with the gang adjacent the inner end thereof, a compression spring acting between the rod and a point on the associated gang spaced substantially inwardly from the gang pivot yieldably urging the inner end of the gang downwardly, the pivots for said rods being spaced from the pivots of the associated gang in the direction in which the inner ends of the gangs are moved toward angled position so that the distance from the rod pivots to the gangs decreases as the gangs are angled with respect to the frame whereby the downward force exerted on the gangs increases progressively in proportion to their displacement from alined position.

References Cited in the file of this patent

UNITED STATES PATENTS

| Number | Name | Date |
|---|---|---|
| Re. 22,333 | White | June 8, 1943 |
| 540,550 | Hisle | June 4, 1895 |
| 632,778 | Burdick | Sept. 12, 1899 |
| 799,607 | Lindgren | Sept. 12, 1905 |
| 1,568,896 | McKay | Jan. 5, 1926 |
| 2,192,252 | Zink et al. | Mar. 5, 1940 |
| 2,251,500 | Short | Aug. 5, 1941 |
| 2,339,124 | White | Jan. 11, 1944 |